United States Patent [19]

Uesaka

[11] Patent Number: 4,741,174
[45] Date of Patent: May 3, 1988

[54] ICE CREAM FREEZER

[75] Inventor: Susumu Uesaka, Funabashi, Japan

[73] Assignee: Nippon Light Metal Company, Ltd., Tokyo, Japan

[21] Appl. No.: 42,065

[22] Filed: Apr. 24, 1987

[30] Foreign Application Priority Data

Aug. 20, 1986 [JP] Japan .......................... 61-125812[U]

[51] Int. Cl.4 ............................................. A23G 9/12
[52] U.S. Cl. ...................................... 62/342; 62/529; 220/404; 366/149; 366/204
[58] Field of Search ........................ 62/342, 343, 529; 366/149, 204; 220/403, 404

[56] References Cited

U.S. PATENT DOCUMENTS

| | | | |
|---|---|---|---|
| 2,809,498 | 10/1957 | Allen | 62/342 |
| 3,052,371 | 9/1962 | Van Bemmelen | 220/404 X |
| 3,487,989 | 1/1970 | Rausing et al. | 220/404 X |
| 3,790,021 | 2/1974 | Bailey | 220/404 |
| 3,834,570 | 9/1974 | Barr | 220/403 X |
| 4,379,455 | 4/1983 | Deaton | 220/404 X |
| 4,459,793 | 7/1984 | Zenger | 220/404 X |
| 4,488,817 | 12/1984 | Uesaka | 62/342 X |

FOREIGN PATENT DOCUMENTS 60-11812 4/1985 Japan .
61-9584 3/1986 Japan .

*Primary Examiner*—William E. Tapolcai
*Attorney, Agent, or Firm*—Armstrong, Nikaido, Marmelstein & Kubovcik

[57] ABSTRACT

This invention relates to an apparatus comprising a double walled container in which a heat regenerating agent is sealed, a heat insulating ring mounted on the upper periphery of said double walled container, a supporting shoulder located on the external periphery of said heat insulating ring, an engaging portion located at the lower periphery of said supporting shoulder, and a mating portion located on a cover for detachably mounting in engageable mating portion provided in a handle projecting from said external case.

8 Claims, 6 Drawing Sheets

ICE CREAM FREEZER

FIELD OF THE INVENTION AND RELATED ART STATEMENT

The present invention relates to an improvement of an ice cream freezer to make ice cream, sherbet, etc. for use easily in a home freezer.

A typical conventional ice cream freezer that was invented by the applicant of this invention, is shown in FIG. 10 and comprises a double walled cylindrical sealing container (c) having an open top and heat regenerating agent (b) sealed in a space (a) covering the bottom and circumference thereof and an external cylindrical case (d) having a bottom and a detachable cover (e) placed between the double walled sealing container (c) and the external case (d) and a rotable mixer (f) secured at the center of the cover (e). Mixing the material for ices contained in the double walled sealing container (c) is effected by a handle (g) which is pivotably secured to the mixer (f) and which has two blades (i) provided on a shaft (h) of the mixer (f) that mix the material for ices.(Refer to Japanese Utilty Model Examined Publication No. 60-11812 and Japanese Utility Model Examined Publication No. 61-9584).

However, frictional engagement of the cover (e) with a heat insulating ring (j) secured to the top end of the double walled sealing container will produce unsteadiness of the cover (e). In order to prevent this unsteadiness of the cover (e), a bayonet type engagement comprising a boss (k) provided on the inner surface of the cover (e) for securing the boss (k) to a mating boss (l) located on the outer surface of the mouth of the opening of the case (d) has been employed. This however makes the setting of the cover (e) complicated. Furthermore, poor engagement of the double walled sealing container (c) with the external case (d) when the top external edge thereof is placed on the external case (d) will produce unsteadiness when they are used in an inclined function and this will make it difficult for the container to be used as a cooling cup etc.

OBJECT AND SUMMARY OF THE INVENTION

The purpose of this invention is to provide an ice cream freezer that is useable as a cooling cup, a mug, or the like by allowing the double walled container to be secured to the external case with the aid of heat insulating ring mounted on the top edge of the exterior of the double walled container.

A further purpose of this invention is to provide an ice cream freezer characterized in that the setting of the cover can be effected speedily and easily.

An ice cream freezer according to this invention comprises a double walled container containing a freezing agent and a heat insulating ring mounted on the top edge of the double walled container, an external case which accomodates the double walled container and supports the heat insulating ring at a certain interval from the double walled container, a cover detachably mounted on the heat insulating ring, and a mixer rotatably inserted in the double walled container, and is characterized by the provision of a shoulder on the outer circumference of the heat insulating ring for securing the top edge of the external case, a securing portion in the lower circumference of the supporting shoulder for close contactness with the inner upper surface of the external case, an engageable mating portion projected from the cover for detachable engagement with the mating portion located in a handle projectingly provided on the external case.

In this invention, it is permissible for the securing portion provided in the heat insulating ring simply to be closely in contact with the inner surface of the external case when the double walled container is mounted on the external case, then the double walled container is mounted on the external case, but a more preferable form is one which a gently tapering is provided over the entire surface of the lower of a supporting shoulder, or one in which a thread is provided at a proper interval on the circumference of the lower portion.

It is permissible for the mating portion provided on the handle for securing the boss provided in the cover to simply be such that mating portion can be easily secured at the time of at mounting, but a more preferable form is one having an upwardly concave shape, an outwardly depression shape or a hole drilled in the upper portion of the handle.

Furthermore, it is permissible for the cover to simply be detachably mounted on the heat insulating ring, but a more preferable form is a structure in which the cover is detachably mounted on the inside surface or outside surface of the heat insulating ring.

In the ice cream freezer of this invention, it is made possible to easily and securely fit the double walled container into the external case and to prevent unsteadiness of the double walled container by providing a shoulder on the outer circumference of the heat insulating ring mounted on the top edge of the double walled container containing cooling agent, thereby securing it to the top edge of the case, by providing an portion in the circumference of the lower portion of the supporting shoulder which may be in close contact with the top inside circumference of the external case, and by providing a portion in the cover for detachably securing the mating portion of the handle. Thus in order to mount the cover easily and speedily, it is only necessary to engage the portion provided in the cover with the handle of the external case. Since it is possible to use the apparatus of this invention as a cooling cup or a mug in the state wherein the double walled container is within the external case, it is possible to utilize it for a variety of purposes other than as an ice cream freezer. Furthermore, because of its simple structure, reductions in size will allow the apparatus of this invention to be made suitable for personal use.

DETAILED DESCRIPTION OF PREFERRED EMBODIMENTS

Embodiments of this invention will now be described with reference to the drawings.

Figure 1:
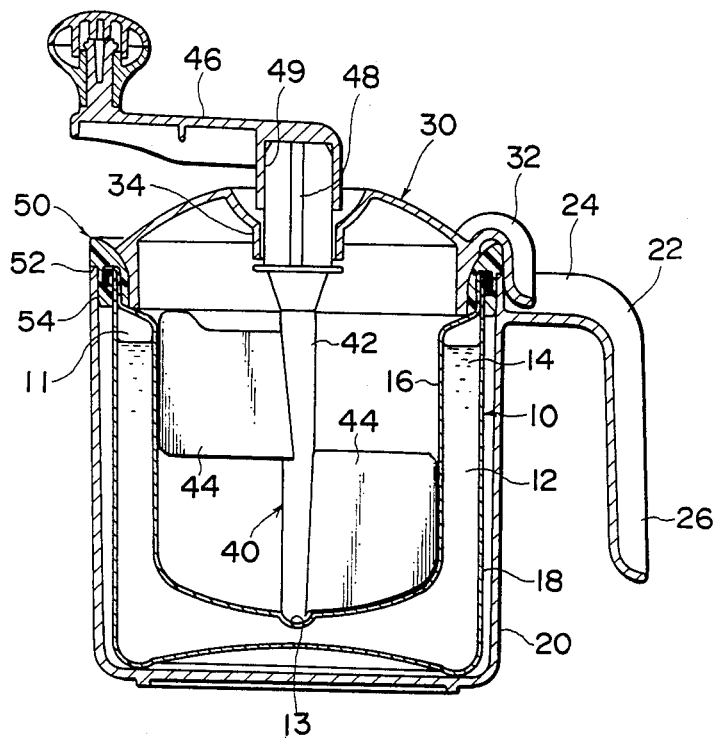
FIG. 1 is a cross sectional view of an embodiment of an ice cream freezer of this invention.

FIG. 1 is a cross-sectional view of the first embodiment of this invention. The main structure of an ice cream freezer of this invention incorporates a double walled cylindrical sealing container 10 having an open top and heat regenerating agent 14 sealed in a space 12 covering the bottom and circumference thereof and an external cylindrical case 20 accomodating the double walled container 10 at a interval having a bottom and a detachable cover 30 detachably mounted on a heat insulating ring 50 for securing at the top end of the double walled container and a rotatable mixer 40 secured at the center of the cover 30.

The double walled container 10 is a combination of a deeply drawn internal container 16 made of aluminum and an external case 18 with a space between them at the bottom and around the circumference and a flange formed at the mouth of the opening, the overall shape being cylindrical. In this case, anode acid plating is applied to the entire surface of the internal container 16 and the external case 18 after deep drawing the aluminum alloy plate. The cooling agent 14 is sealed within the space 12 between both containers 16, 18 at bottom and circumference with desired space 11 remained before securing both containers 16, 18 before they are secured each other with a desired space 11 remaining at the bottom and around the circumference. The cooling agent 14 comprises, for example, water or aerated water to which organic matter acting as a thickening agent such as alchohol, glycol, ethylene glycol, sodium chloride, or the like is added so as to obtain a desired viscosity having a regulated melting point between 7° C. below zero and 17° C. below zero.

Figure 2:
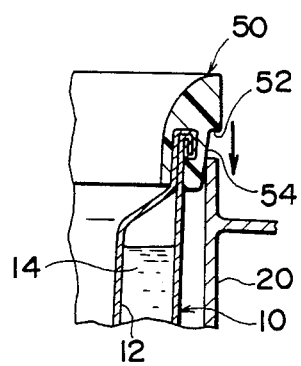
FIG. 2 is a partial cross sectional view showing the state of association between a double walled container and an external case in the first embodiment of this invention.

A heat insulating ring 50 is attached to the top edge of the opening of the double walled container 10, the structure of which is described above. The external surface of this heat insulating ring 50 has a supporting shoulder 52 for engagement with the top edge of the external case 20 and furthermore, has a gentle taper 54 at the lower circumferential portion for engagement with the inside surface of the upper portion of the external case 20. The combination of elastic deformation of the heat insulating ring 50 itself and the gentle taper 54 makes the setting of the double walled container 10 easy and secure when the double wall container 10 is placed into the external case 20.(Refer to FIG.2)

The external case 20 is made of synthetic resin or similar and has a handle that projects from the external surface in the form of an inverted L-shape.

Figure 3:
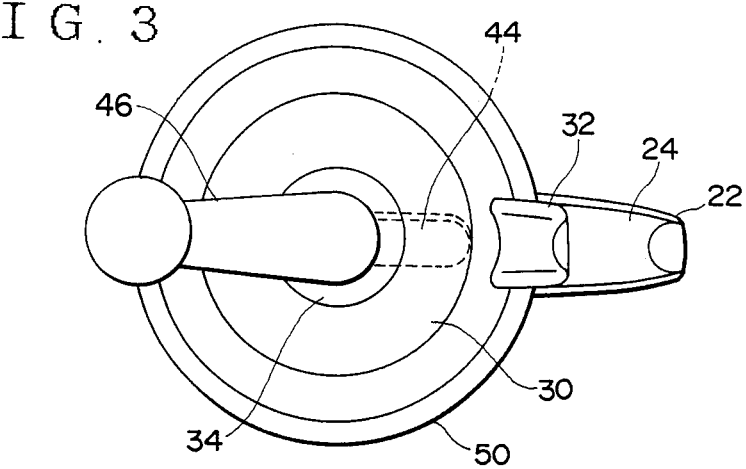
FIG. 3 is a plan view of the ice cream freezer of the first embodiment of this invention.
Figure 4:
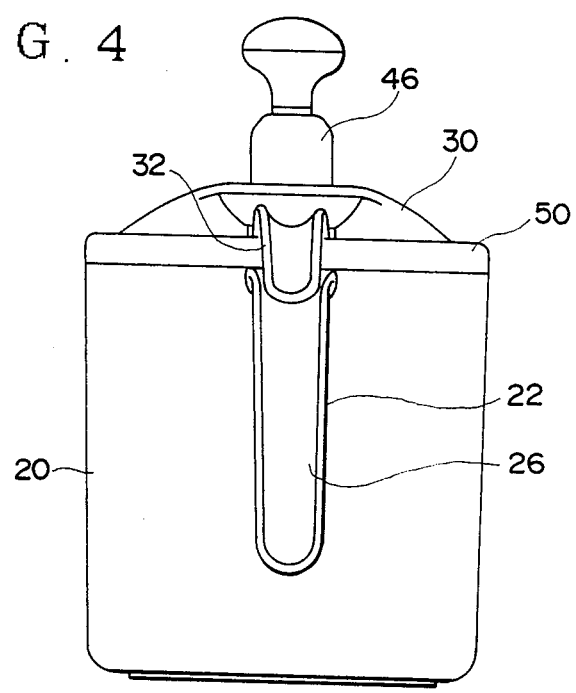
FIG. 4 is a side view of the ice cream freezer of the first embodiment of this invention.

The cover 30 is made of transparent synthetic resin or the like and is detachably mounted on the inside surface of the heat insulating ring at the opening of the double walled container 10. In FIG.3 and FIG. 4, a roughly inverted-L shaped boss 32 for engagement with an upwardly facing depression 24 which is located at the upper portion of the handle 22 of the external container 20 is provided in the outer circumference of the cover 30.

Hence the engaging boss 32 facilitates attachment and detachment of the cover 30.

Figure 5:
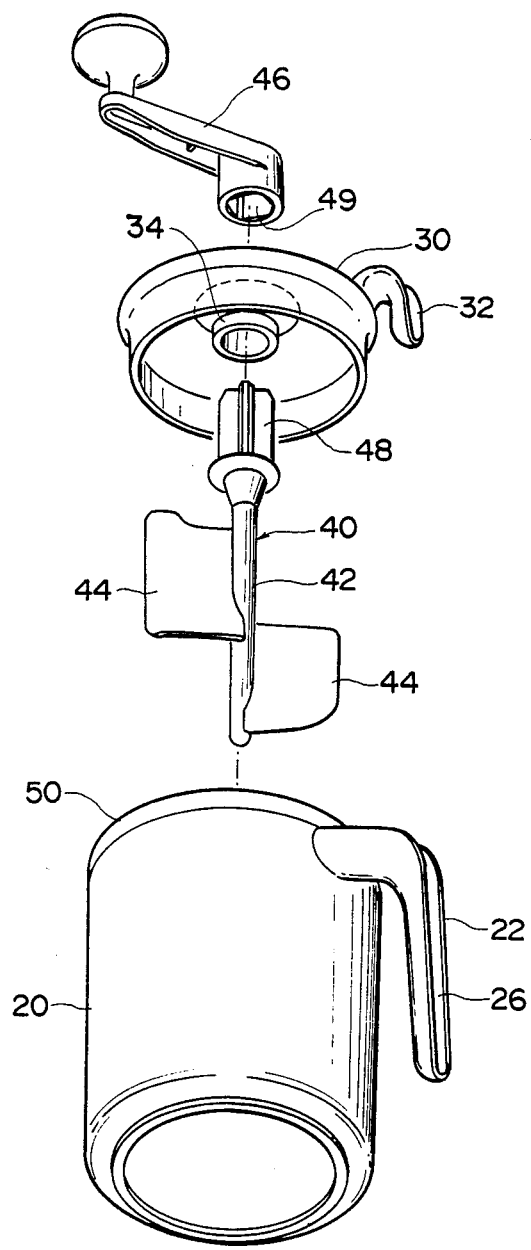
FIG.5 is a perspective view showing the assembly of parts.

The mixer 40 comprises a shaft 42 that passes through a bearing hole 34 located at the center of the cover 30 to the interior of the double walled container 10, and a blade 44 extending laterally from the shaft 42. The tip of the shaft 42 is rotatably secured within a depression 13 at the center of the bottom of the double walled container. It is possible for the edge of the blade 44 to move in contact with the inner surface of the double walled container. The mixer 40 is able to be rotated by the handle 46 that is engaged with the shaft 42 which is rotatably inserted through the bearing hole 34 drilled in the cover 30. In this case, a cross spline 48 is provided for the top end of the shaft 42 of the mixer 40. A square groove 49 which engages with the spline 48 is provided in the handle so as to allow the handle to be moved in the correct direction of rotation only.(Refer to FIG.5)

The process of freezing ices with an ice cream freezer having the structure described above is as follows.

First, the double walled container 10 is placed in a freezer for several hours to freeze the freezing agent 14 contained therein. Then the double walled container 10, the external container 20, the cover 30 and the mixer 40 are assembled and material for making ices is put in the double walled container 10. As a result of the freezing, the material for making ices become a thin frozen layer on the wall of the double walled container 10. In order to produce ice cream or sherbet from the material in several minutes, the thin frozen layer is repeatedly stirred to separate and flake the material from the wall by means of the blades 40 of the mixer, the tip of the blades moving in contact with the inner wall of the double walled container 10. If a beverage is placed in the double walled container 10 with the cooling agent 14 frozen when assembled with the external case 20, it is possible to cool the beverages therein instantaneously with no fear of dilution. Thus this freezer may be used as a cooling cup or mug.

Figure 6:
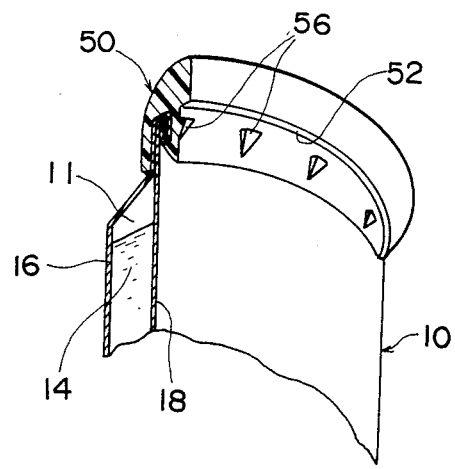
FIG.6 is a partial cross sectional view of a second embodiment of this invention.

The embodiment described above utilizes a gently tapering portion 54 formed on the external surface of the heat insulating ring to allow the double wall container 10 to be set correctly in the external case 20, however it is not essential to employ this kind of tapering portion 54: the second embodiment shown in FIG.6 utilizes securing means as threads 56, 56 . . . located at proper intervals around the circumference of the lower portion of the supporting shoulder 52.

Figure 7:
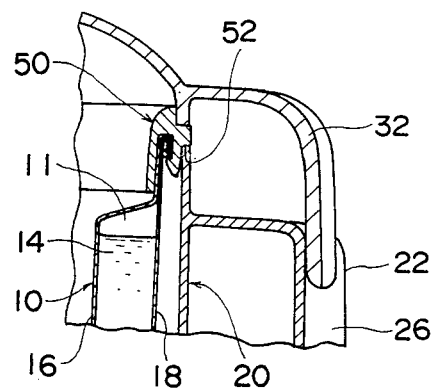
FIG. 7 is a partial and developed cross-sectional view of the third embodiment of this invention.

FIG. 7 shows the third embodiment of this invention in which a depression in the handle 22 facing sidewardly is utilized in place of the upwardly facing depression 24 shown in FIG.1. The engaging boss 32 of the cover 30 can be detached from the depression 26 of handle 22 which opens outwardly. In this embodiment, the cover 30 is detachably mounted on the exterior of the heat insulating ring 50: it is also permissible to mount it detachably on the inside surface of the heat insulating ring 50 as shown in the first embodiment.

Figure 8:
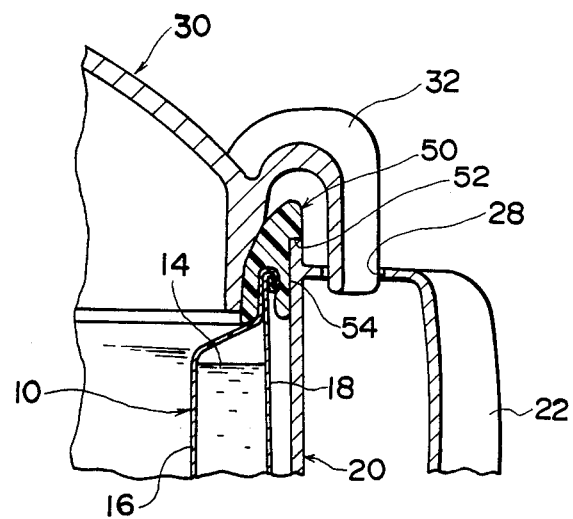
FIG. 8 is a partial and developed cross sectional view of a fourth embodiment of this invention.
Figure 9:
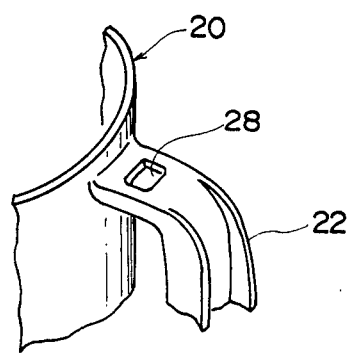
FIG. 9 is a perspective view of the securing portion of the fourth embodiment of this invention.
Figure 10:
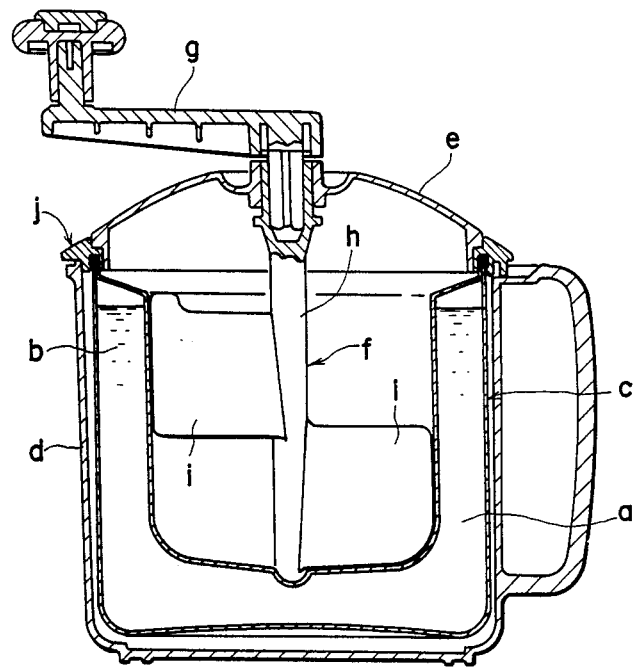
FIG. 10 is a cross sectional view of a conventional ice cream freezer.
Figure 11:
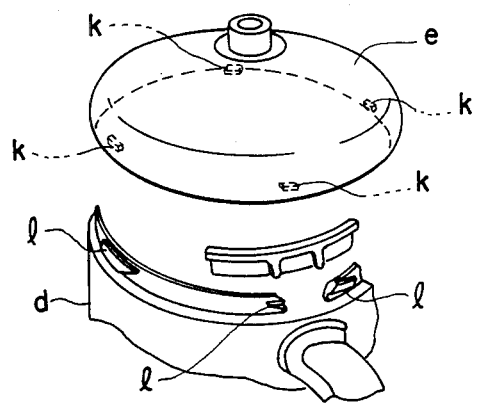
FIG. 11 is a perspective view of another example of a conventional ice cream freezer in the state wherein the cover is attached.

FIG. 8 is a partial cross-sectional view of the fourth embodiment of this invention. FIG.9 is a partial and perspective view of the handle utilizes this fourth embodiment of the invention wherein the depression is replaced by a hole. That is, the hole 28 formed vertically through the upper portion of the handle 20 of the external case allows a mating engageable boss 32 projecting from the cover 30 to detachably fit thereinto.

The embodiments described above employ an engagement which allows the engageable mating boss 32 to be detachably engaged with the upwardly or sidewardly facing depressions 24 or 26, or the hole 28. Provision of the following supplementary measure will make setting of the cover 30 even more secure. That is, by forming a secondary upwardly facing depression on the oppositee side of the handle 22 of the exterior container 20 and forming an inverted U-shaped bolt on the opposite side of the engaging boss 2 of the cover 30 and making them detachably engageable with each other, the setting of the cover 30 will be made even easier.

What is claimed is:

1. An ice cream freezer having a double walled container containing therein a heat regenerating agent and with a heat insulating ring mounted at the top end thereof, an external case containing said double wall container and simultaneously supporting said heat insulating ring, and a cover detachably mounted on said heat insulating ring, and a mixer rotatably inserted into said double walled container, characterized by having a supporting shoulder provided in said heat insulating ring for engagement with the top end of said external case, a portion for engagement provided at the lower periphery of said supporting shoulder for close contact with the inner upper portion of said external case, and a mating portion projecting from said cover for detachably fitting into a portion of a handle projecting from said external case.

2. The ice cream freezer of claim 1 wherein the portion of said supporting shoulder of said heat insulating ring for engagement has a gentle taper over the entire surface of the lower portion thereof.

3. The ice cream freezer of claim 1 wherein a slight threaded portion for engagement is provided at intervals around the periphery of the lower portion of said supporting shoulder of said heat insulating ring.

4. The ice cream freezer of claim 1 wherein an upwardly facing portion for engagement is provided in the upper portion of said handle.

5. The ice cream freezer of claim 1 wherein an outwardly facing depression for engagement is provided in the side portion of said handle.

6. The ice cream freezer of claim 1 wherein an engaging hole is provided in the upper portion of said handle.

7. The ice cream freezer of claim 1 wherein a cover is detachably mounted on the inner periphery of said heat insulating ring.

8. The ice cream freezer of claim 1 wherein a cover is detachably mounted on the periphery of the external surface of said heat insulating ring.

* * * * *